United States Patent
Suomela et al.

(10) Patent No.: US 7,575,168 B2
(45) Date of Patent: Aug. 18, 2009

(54) METHODS, DEVICES AND COMPUTER PROGRAM PRODUCTS FOR GENERATING, DISPLAYING AND CAPTURING A SERIES OF IMAGES OF VISUALLY ENCODED DATA

(75) Inventors: Hartti Suomela, Sunnyvale, CA (US); Ingrid Schembri, Vantaa (FI); Oleg Beletski, Espoo (FI); Jukka Heinonen, Helsinki (FI); Tony N. Von Knorring, Helsinki (FI)

(73) Assignee: Nokia Corporation, Epsoo (FI)

( * ) Notice: Subject to any disclaimer, the term of this patent is extended or adjusted under 35 U.S.C. 154(b) by 143 days.

(21) Appl. No.: 10/956,415

(22) Filed: Oct. 1, 2004

(65) Prior Publication Data
US 2006/0071077 A1    Apr. 6, 2006

(51) Int. Cl.
G06K 7/10    (2006.01)
(52) U.S. Cl. .............................. 235/462.01; 235/462.06; 235/462.12
(58) Field of Classification Search ............ 235/462.01, 235/462.08, 462.12, 462.06
See application file for complete search history.

(56) References Cited

U.S. PATENT DOCUMENTS

| 6,263,796 | B1* | 7/2001 | Jordan ................... 101/486 |
|---|---|---|---|
| 6,786,420 | B1 | 9/2004 | Silverbrook |
| 2004/0046024 | A1 | 3/2004 | Natsukari et al. |
| 2005/0007388 | A1* | 1/2005 | Charbonneau ............... 345/684 |
| 2005/0018213 | A1* | 1/2005 | Marti ......................... 358/1.1 |
| 2005/0060300 | A1 | 3/2005 | Stolte et al. |
| 2005/0085188 | A1* | 4/2005 | Ishii et al. ................... 455/41.2 |
| 2006/0124742 | A1* | 6/2006 | Rines et al. ............ 235/462.01 |
| 2007/0131772 | A1* | 6/2007 | Lubow .................. 235/462.01 |
| 2007/0213938 | A1 | 9/2007 | Kai |

FOREIGN PATENT DOCUMENTS

| WO | 2005104933 A1 | 11/2005 |
|---|---|---|
| WO | 2005116916 A1 | 12/2005 |

OTHER PUBLICATIONS

International Search Report for PCT/IB2005/002961, dated Jan. 26, 2006.

* cited by examiner

*Primary Examiner*—Karl D. Frech
(74) *Attorney, Agent, or Firm*—Alston & Bird LLP

(57) ABSTRACT

Methods, devices and computer program products that provide for generating a series of visual coded images, such as barcodes that are related to a data set, displaying the series of visual coded images in sequence on a display and capturing and decoding the displayed series of visual images in one continuous process. As such the present invention provides for large volumes of data to be transferred using images of visually coded data, which are typically limited to storing and transferring a relatively small volume of data.

51 Claims, 7 Drawing Sheets

METHODS, DEVICES AND COMPUTER PROGRAM PRODUCTS FOR GENERATING, DISPLAYING AND CAPTURING A SERIES OF IMAGES OF VISUALLY ENCODED DATA

FIELD OF THE INVENTION

This invention relates to visually encoded data, and more particularly, relates to methods, devices and computer program products that provide for generating visually encoded data and displaying the decoded data and the image element on a digital device.

BACKGROUND OF THE INVENTION

"Tag" is the term commonly referred to in the wireless communication industry as the physical embodiment of the information containing device. A tag can refer to a visual tag, a Radio Frequency Identification (RFID) tag, an audible tag or the like. In practice, the tag is interrogated by a corresponding device in order for the information to be wirelessly communicated and read by the receiving device. For example, in RFID communication, the term "tag" refers to a transponder, which is an integrated circuit containing the RF circuitry and information to be transmitted. The RFID tag is typically contained within relatively compact packages, such as embedded within a credit-card type package, a key fob or the like. The compact nature of the tags makes them highly portable and adaptable to many different applications. However, the compact nature of the tag tends to limit the size of the memory unit and, thus, the amount of information that can be stored and transmitted by the tag is limited. Typically, current tags are limited to a memory size of less than about 128 bytes of storage space. In addition to physical constraints, tags are typically high-volume, low cost devices that are generally disposable. Thus, even though the physical size of the tag may allow for additional memory space, the cost related to adding additional memory is typically economically prohibitive.

In other wireless communication mediums visual tags are utilized that implement a visual symbology, such as barcoding, as the data storage unit. The visual tag may take the physical form of a label, ticket or the like having a printed visual code imprinted on the tag. Barcodes can either be one-dimensional, i.e., linear, such Universal Product Code (UPC), Code 128 or the like, or barcodes can be two-dimensional in nature, such as DataMatrix, MaxiCode, Quick Response (QR) code or the like. While 2D barcodes afford for a much greater amount of information storage capacity than conventional linear barcodes, all visual codes are relatively limited in the amount of data that they contain and subsequently transmit because the physical size of the tag is generally restrictive. Additionally, error checksum and error correction information is generally stored alongside the payload information further limiting the amount of data stored in the barcode.

Many handheld devices are typically equipped with various forms of wireless communication. For example, cellular telephones are becoming multi-faceted communication devices, no longer limited to wireless cellular communication, they may additionally provide for RFID communication, Bluetooth® communication, IR (Infrared) communication and the like. An additional short-range data communication mechanism can be implemented by equipping one handheld device with image capture means, such as a camera and equipping another device, handheld or otherwise, with the ability to generate and display visual tags, in the form of barcodes or other encoded symbologies, on the device's display. However, the problem of limited visual tag data storage and data communication is exasperated in the handheld device because the number of pixels in the display of such devices is limited, the camera capabilities in such devices are generally limited and other factors. In the case of RFID communication, as previously noted, the amount of information that can be transmitted from any one single tag is limited by the memory capacity of the tag.

Numerous solutions have recently been developed to address the problems related to limited data communication in applications using tags. In one method, information transmitted from a tag initiates some other supplemental form of wireless communication, whereby the supplemental communication means provides the primary source of information transfer. For example, the tag may be limited to containing a network address of a sharing device and an information content address on the sharing device. Once this tag is read, the reading device initiates a supplemental communication means, such as a short-range wireless communication means, like Bluetooth®, IR or the like, to communicate with the sharing device, using the network address and content address provided by the tag. This allows for a larger amount of data to be communicated from the sharing device than would otherwise be possible from the tag. However, this type of data transfer is only possible if the reading device is equipped with a supplemental communication means, such as a short-range wireless communication means. Additionally, even if the reading device is sufficiently equipped with the requisite supplemental communication means, certain short-range means may be prone to service outages. Therefore a need exists to develop a method to communicate large volumes of information that solely relies on tags as the transmission mechanism.

In one highly speculative proposed method that relies solely on tags, the contents of an entire book is communicated using a series of 1000 or more 2D barcodes, such as Maxi-Code symbology, displayed on a screen and subsequently captured and decoded by a combination Personal Digital Assistant (PDA) and camera. However, according to this proposed method the suggested data transfer rate is 1000,000 bytes per 3.125 seconds, which is significantly beyond current technology capability. The PDA, or any other similar digital device, would not be capable of decoding the images at such a high-speed rate. The proposed method provides for any actual technical solution as to how such data transfer could be accomplished and provides, merely, a desire that this method could be feasible. It is noted that the typical time needed to decode a single barcode image will vary based on the image quality, lighting, shadows, pixel alignment and the like. In practice, individual barcodes require ample display time to assure successful decoding and this factor substantially slows down the data transfer rate.

Therefore a need exists to develop methods, devices and computer program applications that provide for large volumes of data to be communicated in applications that rely, solely, on tags as the transmission medium. Such methods, devices and applications will provide for reasonable and currently attainable transfer rates to be employed. In addition, the desired methods, devices and applications will allow for a variance in tag decode time, allowing for multiple tags to be decoded in series with each tag being decoded at its own decode rate.

BRIEF SUMMARY OF THE INVENTION

The present invention provides methods, devices and computer program products that provide for generating a series of visual coded images, such as barcodes that are related to a data set, displaying the series of visual coded images in sequence on a display and capturing and decoding the displayed series of visual images in one continuous process. As such the present invention provides for large volumes of data to be transferred using images of visually encoded data, which are typically limited to storing and transferring a relatively small volume of data. The invention provides for images of visually encoded data to be displayed sequentially, with each next-in-sequence image being displayed at the request of the data capturing and decoding device. As such, the present invention allows for a variance in image display time and decode time, thus allowing for multiple visual coded images to be decoded in series with each image being decoded at its own decode rate. The present invention limits the communication of data to the image capture means, thereby providing a secure transfer means that is not readily susceptible to being deceptively captured by an unwanted recipient.

In one embodiment of the invention a method for generating and displaying visually encoding data for short-range data communication is provided. The method includes the steps of selecting data to be communicated, segmenting the selected data into a plurality of data segments suitable for visual encoding using a single visual tag, providing each of the plurality of data segments with a linking indicator, encoding the plurality of data segments into a plurality images of visually encoded data; and displaying, sequentially, each of the plurality of images of visually encoded data on a display device. Typically, the selected data will be a relatively large volume of data that could not be encoded within a single visual coded.

The step of segmenting the selected data into a plurality of data segments suitable for visual encoding may further entail analyzing the data to compare the data amount to be encoded to chosen visual code data amount limitations or comparing the data amount to be encoded to the size of the display. Such analyzation will determine proper data segment lengths. The step of providing each data segment with a linking indicator is necessary so the capturing and decoding device is notified that the visual coded image belongs to a series of images of visually encoded data and that further images for capturing and decoding are forthcoming. In this regard, the linking indicator may take the form of a data segment number and a total data segment number, for example, data segment 18 of a total number of 32 data segments. Alternatively, the linking indicator may take the form of a notice that further images from the series will be subsequently displayed and available for capture and decoding.

The step of encoding the plurality of data segments into a plurality of visually images may entail using a barcode image or any other symbology to encode the data from each data portion into an image of visually encoded data. For example, if barcodes are used, they may include linear barcodes, such as Uniform Product Code (UPC), Code 128 or the like, or, if two-dimensional barcodes are implemented that may include MaxiCode, DataMatrix, Quick Response (QR) Code or the like. The step of displaying sequentially, each of the plurality images on a display device may further include displaying, sequentially, each of the plurality images on a display device after a device associated with the display has received a decode acknowledgement signal from an image capture and decode device. The decode acknowledgement lets the displaying device know that image that is currently displayed has been properly captured and decoded and that the next in sequence image can now be displayed for capture. The decode acknowledgement may take from of an audible signal, a visual signal, a data signal, a magnetic signal or the like.

The invention is further defined by a method for capturing and decoding visually encoded data via short-range communication. The method includes the steps of capturing a first image of visually encoded data from a series of images, decoding the first image to determine first decoded data, determining that a linking indicator associated with the first image indicates a second image from the series is forthcoming and buffering the first decoded data for subsequent compilation of data related to the series of images of visually encoded data.

The method may further include the steps of capturing a second image from the series of images and decoding the second image to determine second decoded data segment. In the instance, in which the method includes capturing and decoding a second image the method may include the step of determining if a linking indicator associated with the second image indicates that another image related to the first and second images is forthcoming. If a determination is made that no further images from the series are forthcoming for capture, then the method compiles the buffered data and the second decoded data into a complete data set. If a determination is made that further images from the series are forthcoming for capture, then the method buffers the second decoded data for subsequent compilation of data related to the series of images of visually encoded data.

The method may further include the step of generating and communicating a decode acknowledgement signal after completing the decode step of each image. The decode acknowledgement signal notifies the image displaying device that the displayed image has been properly captured and decoded, so that the displaying device can display the next-in-sequence image from the series. The decode acknowledgement signal may take the form of a visual signal, an audible signal, a data signal, a magnetic signal or the like and the form may be dictated by the compatibility of the image displaying device to receive and process the signal.

The invention is also embodied in individual digital devices and a system for generating, displaying, capturing and decoding a series of images of visually encoded data. According to the invention, a first digital device for generating and displaying a series of images of visually encoded data is defined. The first digital device is also the first element of the invention's system embodiment. The first digital device includes a processor capable of executing computer-readable program instructions. The program instructions include first instructions for segmenting data into a plurality of data segments suitable for visual encoding, second instructions for generating a series of images of visually encoded data, each image corresponding to one of the data segments, third instructions for providing a linking indicator for each of the series of images and fourth instructions for sequentially displaying the series of images. The device also includes a display in communication with the processor that receives the series of images and sequentially displays the images. The first digital device may be a handheld or mobile digital device, such as a mobile cellular telephone or the like. Additionally, the first digital device may be a stationary digital device, such as a personal computer, a consumer vending machine, a kiosk or the like.

The computer-readable instructions that are executed by the processor of the first digital device may include fifth instructions for receiving a decode acknowledgement signal and, in response to the signal, displaying a next sequential image from the series of images.

The invention is also embodied in a second digital device for capturing and decoding the series of images of visually encoded data. The second digital device is also the second element of the invention's system embodiment. The second digital device includes an image capturing device capable of capturing the series of images and a processor in communication with the image capture device. The second processor is capable of executing computer-readable program instructions. The computer program instructions include first instructions for decoding the series of images and second instructions for analyzing a linking indicator associated with each image to determine if additional images from the series require capturing. The second digital device may further be defined as a handheld or portable digital device, such as a mobile telephone equipped with a camera unit.

The computer-readable program instruction executed by the processor of the second digital device may further include third instructions for generating and communicating a decode acknowledgement signal after successful decoding of each of the series of images. The decode acknowledgement signal may take the form of an audible signal, a visual signal, a data signal, a magnetic signal or the like.

The invention is further defined by a computer program product for generating and displaying images of visually encoded data. The computer program product includes a computer readable storage medium having computer-readable program instructions embodied in the medium. The computer-readable program instructions include first instructions for segmenting data into a plurality of data segments, second instructions for providing each data segment with a linking indicator, third instructions for visually encoding the plurality of data segments into a series of images and fourth instructions for, sequentially, displaying the series of images on a display device.

In certain embodiments of the invention, the first instructions may further provide for analyzing the data to determine the number of data segments needed based on visual encoding factors, such as symbology type or size of the display area. The second instructions may further define the linking indicator as a data segment number and a total data segment number or a notice that further visually encoded images are forthcoming. The third instructions may further define the images as barcode images, such as linear barcode images or two-dimensional barcode images. The fourth instructions may further include instructions for displaying a next sequential image from the series based on receipt of a decode acknowledgement signal. Alternatively, the invention may be embodied in another computer program product for receiving and decoding a series of images of visually encoded data. The product includes a computer readable storage medium having computer-readable program instructions embodied in the medium. The computer-readable program instructions include first instructions for capturing images of visually encoded data from a series of images, second instructions for decoding the images to determine decoded data, third instructions for processing a linking identifier associated with the captured images to determine if additional images from the series are forthcoming for capture and fourth instructions for buffering the decoded data if a determination is made that more images from the series are forthcoming for capture.

The computer readable program instructions may include instructions for compiling a complete data set if a determination is made that no more images from the series are forthcoming for capture. Additionally, the computer readable program instructions may include instructions for generating and communicating a decode acknowledgement signal upon decoding a captured image.

Thus, the present invention provides for methods, devices and computer program products that provide for transferring relatively large amounts of data using visually encoded images, such as barcodes. Typically, visually encoded images, such as barcodes, are limited in the amount of data that they can store and, thus, transfer. The present invention overcomes this limitation by providing for methods that segment a large volume data set, encode each segment into an individual image of visually encoded data and provided for each of the images to be linked in a series, so that the subsequent transfer and decoding of the images results in the transfer of the entire data set. The present invention benefits from being able to transfer large volume files or data sets using only visual coded images as the transfer medium. Additionally, the invention provides for a decode acknowledgement mechanism that assures that displayed images remain displayed until successful capture and decoding of the image occurs.

BRIEF DESCRIPTION OF THE DRAWINGS

Having thus described the invention in general terms, reference will now be made to the accompanying drawings, which are not necessarily drawn to scale.

Figure 1:
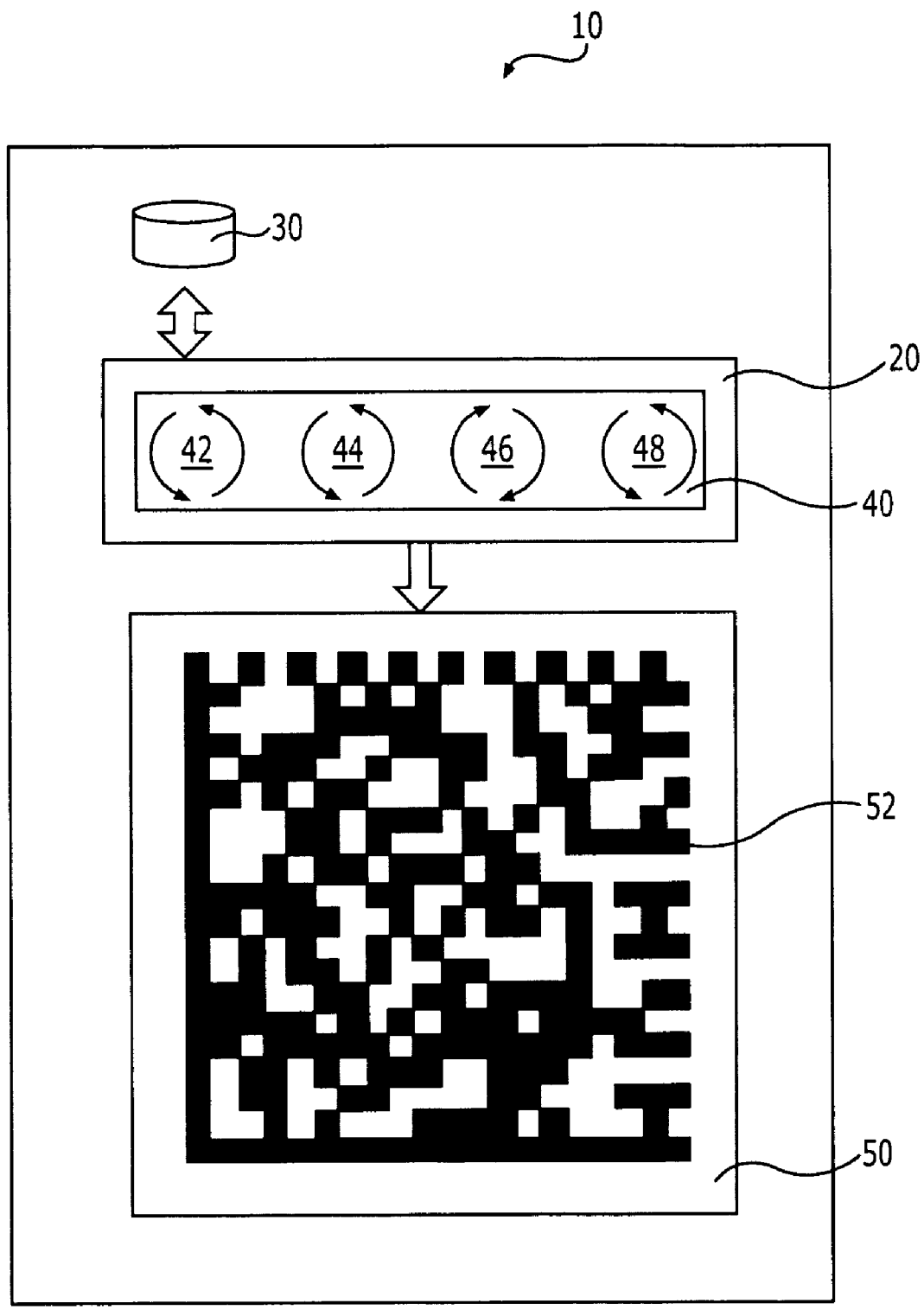

FIG. 1 is a block diagram of a digital device that segments data sets, generates a series of images for each data set segment and displays the segments on a device display, in accordance with an embodiment of the present invention.

Figure 2:
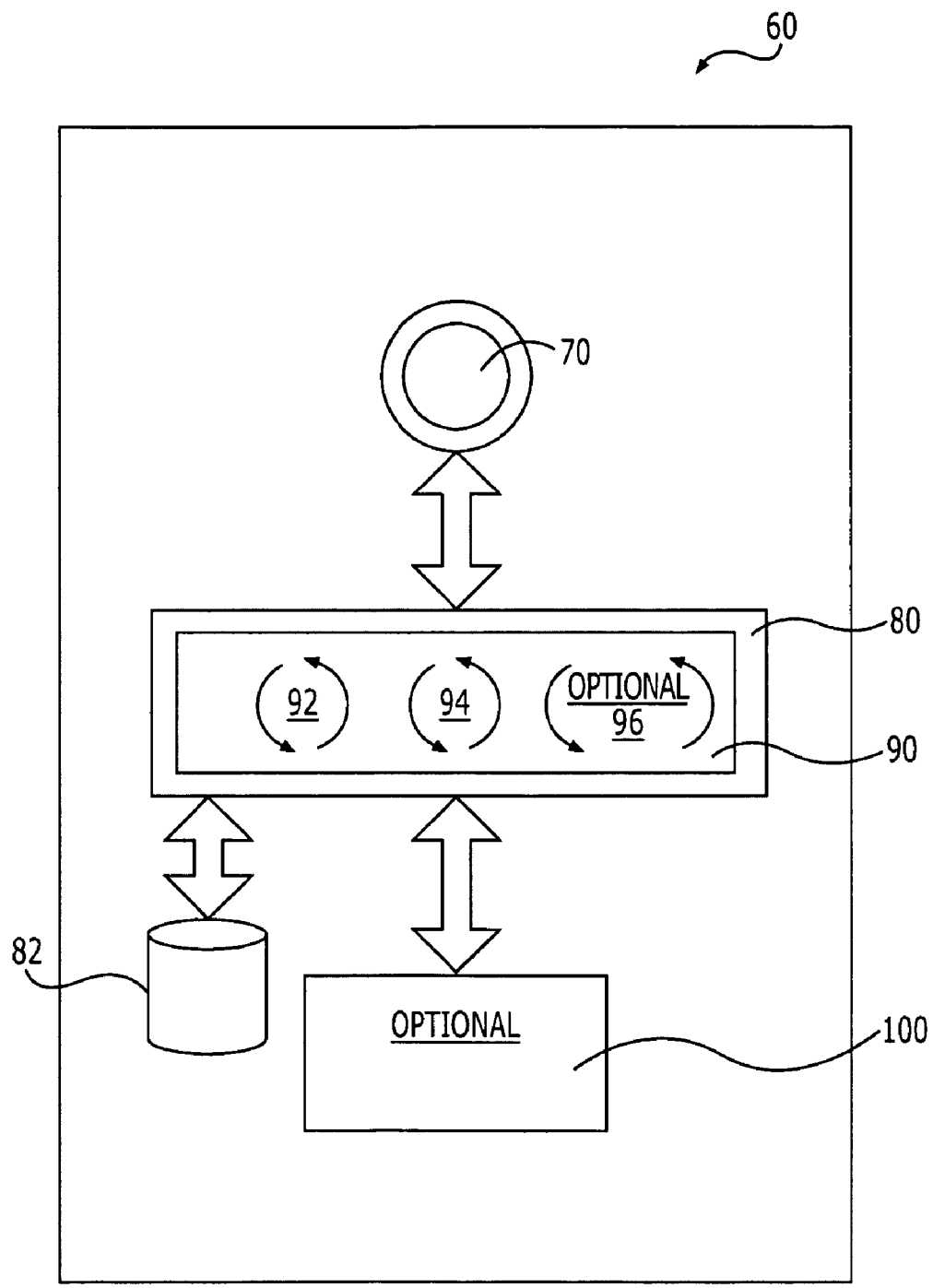

FIG. 2 is a block diagram of a device that captures a series of images of visually encoded data, decodes the captured images and compiles a data set from the decoded data, in accordance with an embodiment of the present invention.

Figure 3:
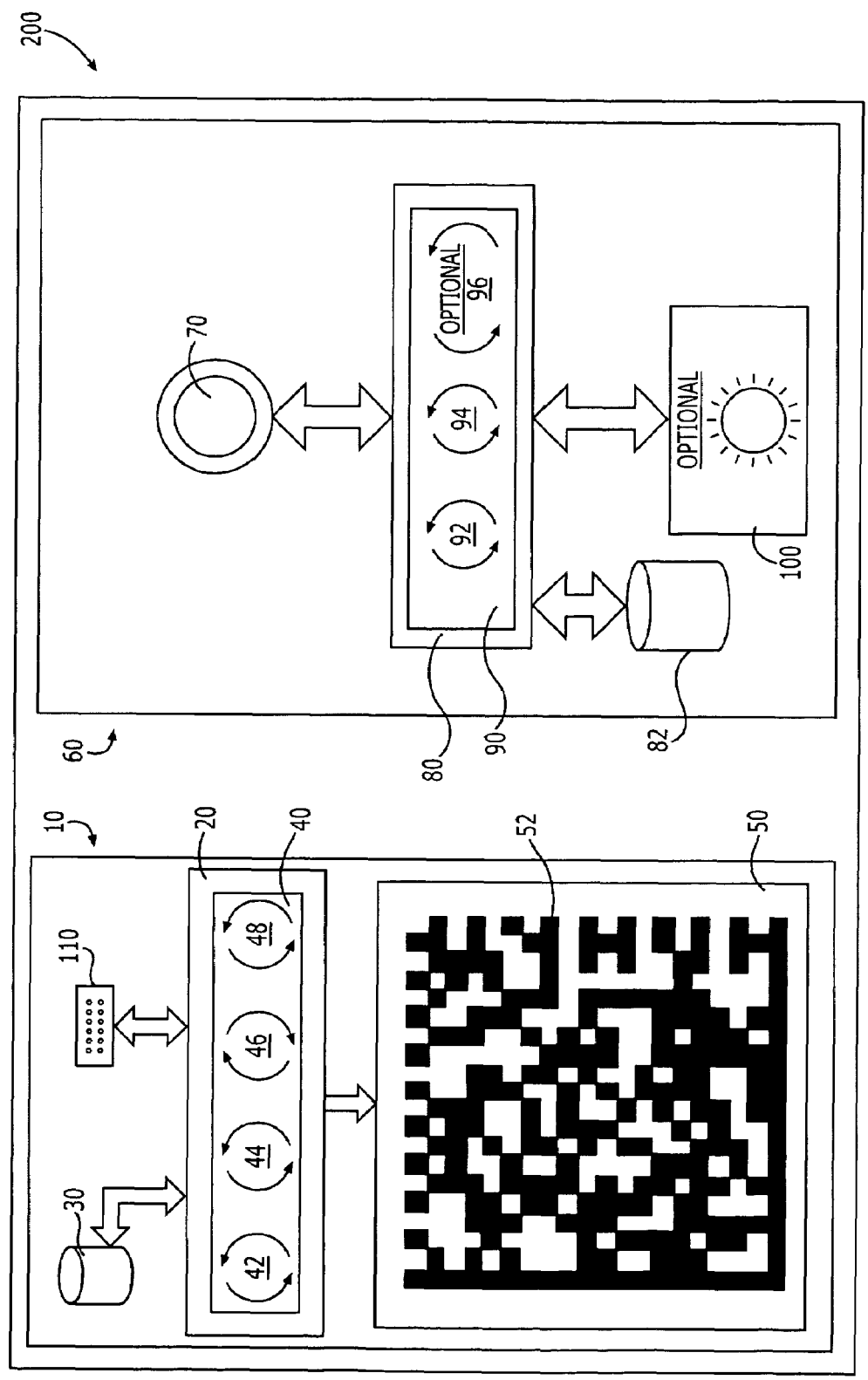

FIG. 3 is a block diagram of a system for transferring a large volume data set by linking images of visually encoded data, in accordance with an embodiment of the present invention.

Figure 4:
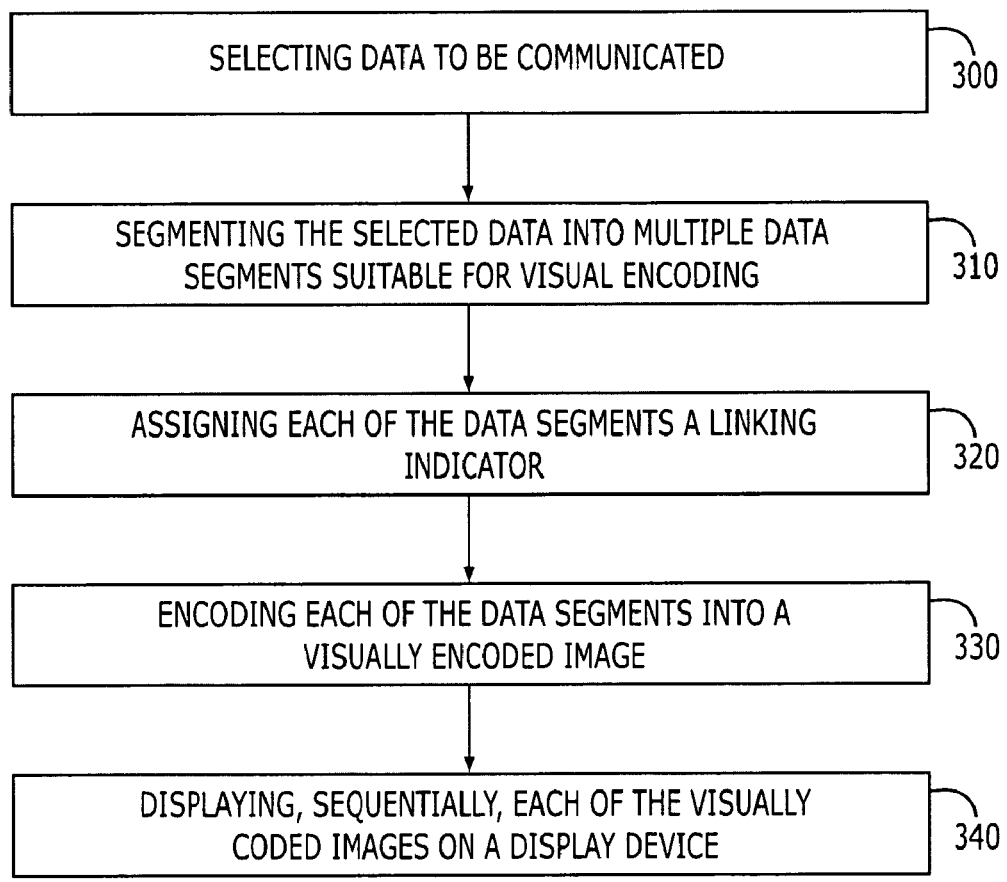

FIG. 4 is a flow diagram of a method for segmenting a data set, generating a series of images of visually encoded data for each segment and displaying the images on a display device, in accordance with an embodiment of the present invention.

Figure 5:
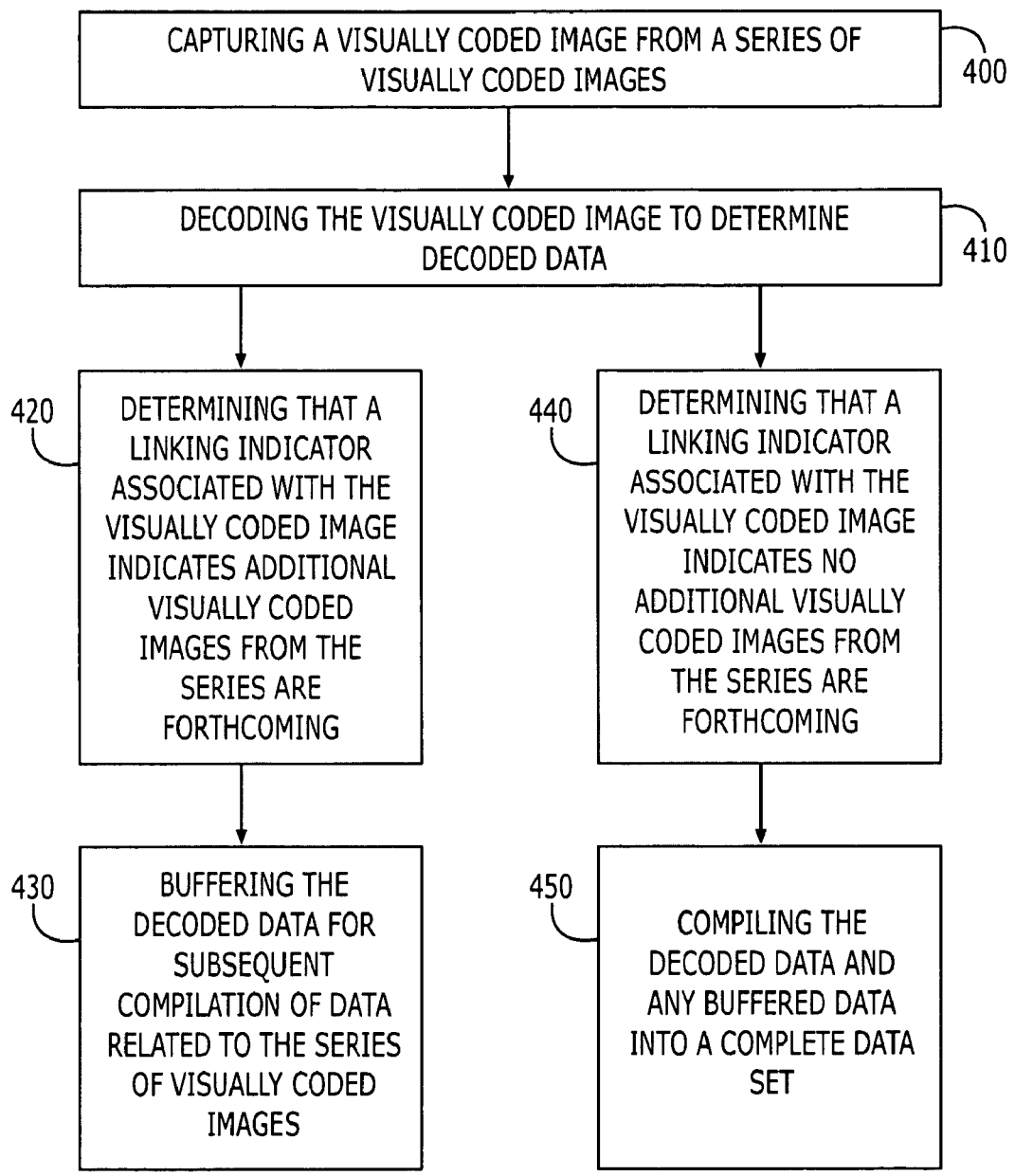

FIG. 5 is a flow diagram of a method for capturing a series of images of visually encoded data, decoding the images and assembling a compiled data set from the decoded data, in accordance with an embodiment of the present invention.

Figure 6:
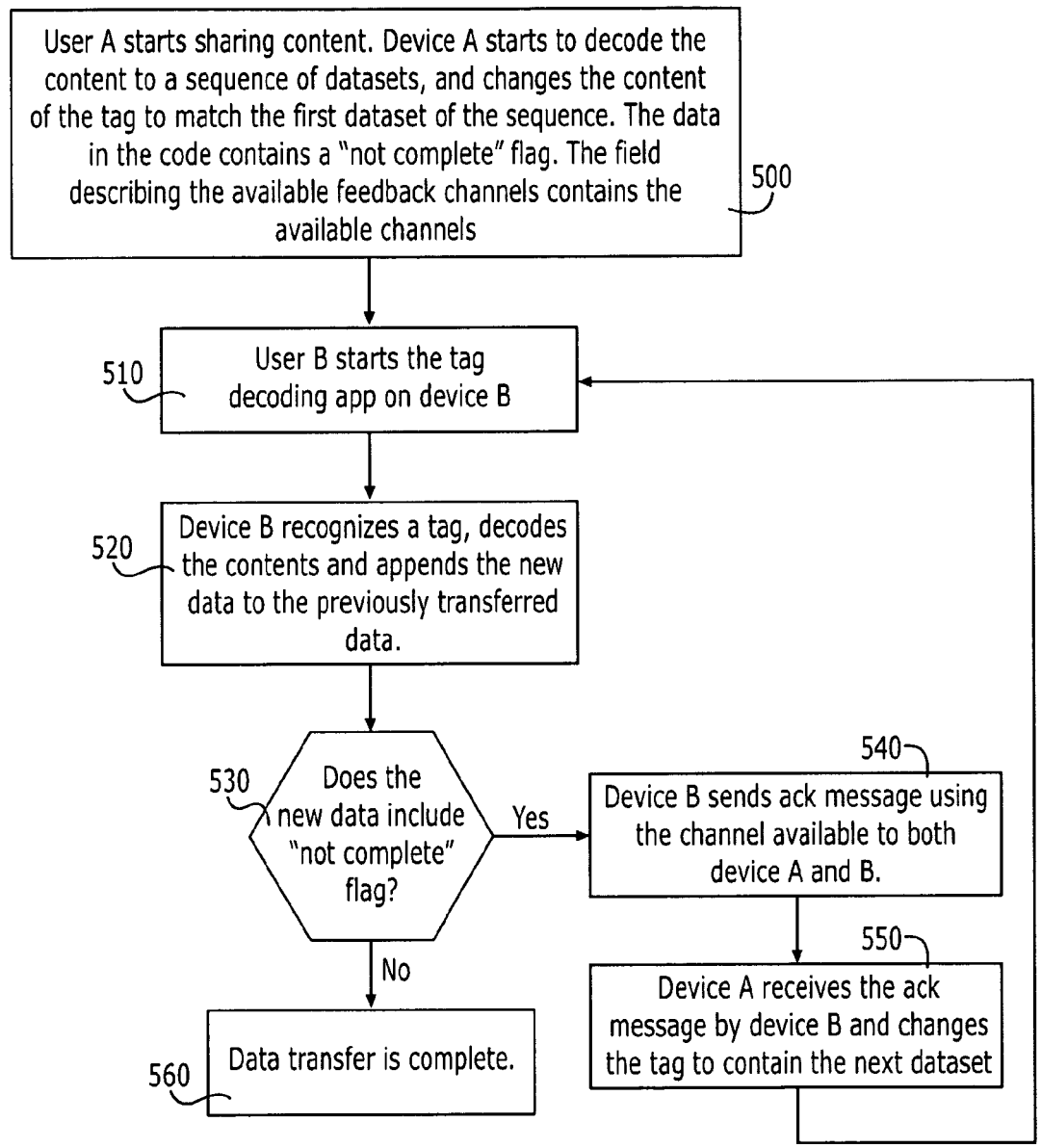

FIG. 6 is a flow diagram of a method for transferring a data set by linking visually encoded images, in accordance with an embodiment of the present invention.

Figure 7:
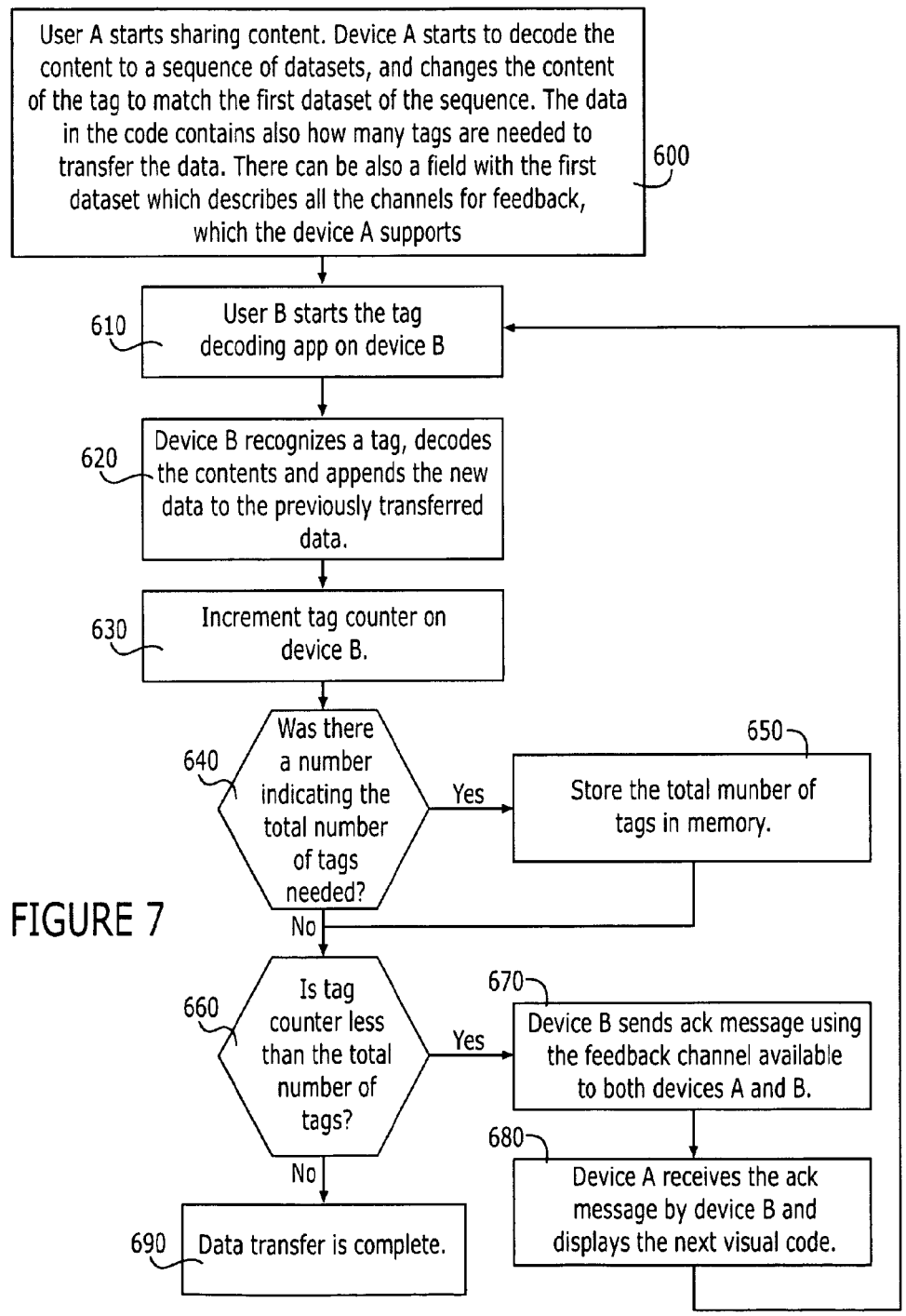

FIG. 7 is a flow diagram of an alternate method for transferring a data set by linking visually encoded images, in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides methods, devices, computer program products and systems that provide for transferring relatively large amounts of data using visually encoded images, such as barcodes. Typically, visually encoded images, such as barcodes, are limited in the amount of data that they can store and, thus, transfer. The present invention overcomes this limitation by providing for methods that segment a large volume data set, encode each segment into an individual image of visually encoded data and provide for each of the images to be linked in a series, so that the subsequent transfer and decoding of the images results in the transfer of the entire data set. The present invention benefits from being able to transfer large volume files or data sets using only visual coded images as the transfer medium. Additionally, the invention provides for a decode acknowledgement mechanism that assures that displayed images remain displayed until successful capture and decoding of the image occurs.

FIG. 1 provides a block diagram of a digital device for generating and displaying a series of images of visually encoded data, also referred to as visual tags, in accordance with an embodiment of the present invention. The digital device 10 of FIG. 1 may be a portable or handheld device, such as a mobile telephone or the like, or the digital device may be a stationary device, such as a personal computer (PC), a consumer vending machine, a kiosk or the like.

The digital device 10 will include a processor 20 that accesses memory 30 to retrieve and execute computer-program instructions. The computer program instructions 40 will include first instructions 42 for segmenting a chosen data set into data segments suitable for visual encoding. In this regard the first instructions will typically analyze the chosen data set, for example an audio file, a text file, an image file or the like and make appropriate decisions as to how the data set should be segmented, i.e., the size of segments, based on visual encoding factors. The visual encoding factors will include, but are not limited to, the type of visual code being implemented and the size of the display on which the visual coded will be displayed.

The computer program instructions will include second instructions 44 for providing a linking identifier for each of the data segments. The linking identifier provides for the data segments to be sequenced. As such, the linking identifier provides the capturing and decode device with notification that the visual code image that has been captured is one of a series of related visual coded images and that more images will subsequently be displayed and require capturing to completely capture the entire data set. The linking identifier may take various forms. For example, the linking identifier may be the combination of a data segment number and the total data segment number (e.g. 8/14 may be the linking identifier for the $8^{th}$ data segment in a series of 14 data segments). In another embodiment all of the data segments in the series, except the concluding segment, i.e., the last segment in the series, may include a field flag or other notice that further images in the series are forthcoming that require capturing in order for the entire data set to be compiled.

Additionally, the computer program instructions will include third instructions 46 for generating a series of images of visually encoded data, in which each image in the series corresponds to a data segment. The type of symbology used to generate the image may include any known or subsequently known symbology, for example linear barcodes or two-dimensional (2D) barcodes may be implemented. Examples of linear barcodes include Universal Product Code (UPC), European Article Numbering (EAN), 128. Code or the like. Examples of 2D barcodes include DataMatrix, MaxiCode, Quick Response (QR) Code and the like. The images will typically encode both the data segment and the previously assigned linking identifier. In alternate embodiments, the linking identifier may be provided to the image after encoding, such that the linking identifier is assigned to an image, as opposed to a data segment. In addition to encoding the data segment and the linking identifier, i.e., the payload, the visual code image may further encode an error correction and/or error checksum. Error correction and error checksum are typically included in the encoded data to insure that visually encoded data is decoded properly.

It is also noted, that according to embodiments of the present invention the series of images may be generated in total prior to displaying the first image of the series, in which case the images that will be subsequently displayed will be stored in an appropriate buffer. The buffer will be accessed when the device is notified that the currently displayed image has been properly captured and decoded. Alternatively, notification provided to the digital device that currently displayed image has been successfully captured and decoded will trigger generation and display of the next sequential image.

The computer-program instructions will also include fourth instructions 48 for displaying, sequentially, the series of images on a display device 50. In the illustrated embodiment display 50 is shown displaying an exemplary Data Matrix 2D barcode 52. The triggering of display of a next-in-sequence visual code image will typically occur once the device receives a decode acknowledgement signal from the capturing/decoding device. Therefore, the computer-program instructions may also, optionally, include fifth instructions for receiving a decode acknowledgement signal and, in response to the signal, displaying a next sequential image from the series of images. The signal, which may be audible, visual, data, magnetic or the like, provides the device with acknowledgement that the currently displayed image had been captured and properly decoded and, therefore, the device may proceed with displaying the next image in the series.

FIG. 2 provides a block diagram of a digital device for capturing and decoding a series of visually encoded images, in accordance with an embodiment of the present invention. The digital device 60 may be, according to a non-limiting embodiment of the present invention, a handheld or portable device that has the capability to capture displayed visual code images. For example, digital device 60 may be mobile telephone equipped with a camera, a personal digital assistant (PDA) equipped with a camera or the like. The digital device 60 will include an image capture unit 70, such as a digital camera unit or the like. The image capture unit is responsible for capturing the series of images displayed on the device shown in FIG. 1.

The digital device 60 will include a processor 80 that accesses memory 82 to retrieve and execute computer-program instructions. The computer program instructions 90 will include first instructions 92 for decoding the series of images.

The decoding instructions will correspond to the encoding symbology used to encode the series of visual coded images. For example, if the visual images are 2D barcodes, encoded with Data Matrix, MaxiCode, QR Code or the like, then the first instructions of the digital device 60 will provide for a routine to decode that type of symbology.

The computer program instructions 90 will additionally include second instructions 94 for analyzing a linking indicator associated with the visual coded image to determine if more images remain in the series and, thus require capturing and decoding. If the instructions determine that the linking indicator indicates that additional images remain in the series, then the decoded data will be buffered for subsequently compilation once all in the data in the data set is decoded. If the instructions determine that the linking indicator indicates that no additional images remain in the series, then all the buffered decoded data will be compiled in a complete data set.

Additionally, the computer program instructions 90 will typically include third instructions 96 for generating and communicating a decode acknowledgement signal. The decode acknowledgement signal is generated upon successful decoding of an image. Once the decode acknowledgement signal is generated it is communicated to the code displaying device, in order to provide the code displaying device with information that will trigger display of the next-in-sequence image. The decode acknowledgement signal may an audible signal, a visual signal, a data communication signal, a magnetic signal or the like. In the illustrated embodiment, the decode acknowledgement signal is an audio signal that is generated by the third instructions and is sent to a communication device, such as loudspeaker 100 that communicates the requisite audible signal.

FIG. 3 is a block diagram of a system for generating a series of images of visually encoded data and sequentially displaying, capturing and decoding the images, in accordance with an embodiment of the present application. The system 200 includes a first digital device 10, equivalent to the digital device 10 shown in FIG. 1 and described above and a second digital device 60, equivalent to the digital device 60 shown in FIG. 2 above. The system will operate in the following manner. A user will interact with a user interface (not shown in FIG. 3) associated with the first digital device to select a particular data set. The chosen data set will be a data set that the user desires to transfer, i.e., communicate from the first digital device to a second digital device. Upon selection of the data set, computer program instructions 40 will be accessed from memory 30 and executed by the processor 40. The computer program instructions will include first instructions 42 for segmenting the chosen data set into multiple data segments suitable for visual encoding, second instructions 44 for providing a linking indicator for each of the plurality of data segments, third instructions 46 for generating a series of images, each image corresponding to one of the data segments, and fourth instructions 48 for sequentially displaying the series of images. Upon directive from the fourth instructions, display 50 will display the first image in the series, such as Data Matrix image 52.

The image capturing device 70 of the second digital device 60 will be engaged by a user of the second digital device to capture the image 52 displayed on the display 50 of the first digital device 10. The captured image will be communicated to the processor 80, which will access memory 82 to retrieve computer-program instructions 90 to process the captured image. The first instructions 92 will decode the captured image. In accordance with an appropriate decode routine. The second instructions 94 will analyze the linking indicator associated with the captured image to determine if additional images in the series will subsequently be displayed on the first digital device. If a determination is made that additional images in the series will be displayed for capture, the instructions will store the decoded data in an appropriate buffer (not shown in FIG. 3) for subsequent compilation of the entire data set. If a determination is made that no additional images in the series will be displayed for capture, then the instructions will compile the entire data set.

Once the captured image is decoded, the processor 80 of the second digital device will typically execute optional third instructions for generating and communicating a decode acknowledgement signal. Once the decode acknowledgement signal is generated it will be communicated to the first digital device by the chosen communication medium. The decode acknowledgement signal may take any known for, such as an audible signal, a visual signal, a data communication signal, a magnetic signal or the like. In the illustrated system embodiment of FIG. 3, the decode acknowledgement signal is an audible signal that is communicated by optional loudspeaker 100 of the second digital device 60 and is received by microphone 110 of first digital device 10. Optional instructions within the first digital device will interpret the audio signal to mean that the currently displayed image has been successfully captured and decoded and, thus, the next-in-sequence image in the series can now be displayed for capturing.

FIG. 4 is a flow diagram of a method for generating and displaying a series of linked images of visually encoded data, in accordance with an embodiment of the present invention. At step 300, a data set is selected for communication or transfer. For example, the data set may be an image file, such as a wallpaper image filed used as a display background on a digital device, such as mobile telephone. The user may desire to share the wallpaper image file with e.g. another handheld device. However, the devices do not have compatible proximity networking/data exchange capabilities or the situation is such that connection establishment between the devices is not preferred (i.e., security issues or excessive connection time requirement). Unlike other forms of data transfer, such as RF communication, which may be susceptible to being intercepted by other unwanted recipients, the display and capture of a series of visually encoded images provides for a highly secure means of data transfer because multiple image captures are required to transfer the entirety of the data. Therefore, the user chooses to employ the transfer method of the present invention, which provides for data transfer via a series of images.

At step 310, the selected data set is segmented into a plurality of data segments. The number and size of the data segments will be determined based on the overall size of the data set, the type of encoding symbology implemented, the viewable area of the display and other factors. At step 320, a linking indicator is assigned to each of the data segments. The linking indicator is assigned to each data segment for the purpose of notifying the capturing and decoding device that the captured image is one of a series of images and that further displayed images in the series require subsequent capture and decode in order to complete the transfer of the entire data set. The linking indicator may take the form of a combination of the data segment number and the total number of data segments or the linking indicator may be a notice field flag that designates additional images require capturing and decoding to complete the entire data set transfer.

At step 330, the data segments are encoded into a series of images. As previously discussed, this step may occur such that all the images in the series are created at the onset of the process (i.e., after the data segments have been defined) and stored in a buffer prior to sequential display. Alternatively, each image may be generated individually prior to display of the image, i.e., after the prior-in-sequence image has been displayed, captured and decoded. The type of visual encoding implemented may vary according to user and device preference. In certain embodiment, the visual encoding will entail barcoding, either linear, 2D or any other barcoding symbology.

At step 340, the images are displayed, sequentially, on a display device. Typically the display of the next-in-sequence image will be triggered by receipt of a decode acknowledgement signal. The decode acknowledgement signal provides the notification that the currently displayed image has been captured and successfully decoded.

FIG. 5 provides a flow diagram of a method for capturing, decoding and compiling a data set corresponding to a series of images, in accordance with an embodiment of the present invention. At step 400, a visually encoded image from a series of visually encoded images is captured and at step 410, the image is decoded according to a corresponding decode routine. Once the decoded data has been decoded, at step 420, it is determined that a linking indicator associated with the image indicates additional images from the series are forthcoming; i.e., additional images will be displayed and require capturing and decoding in order to complete the entire data set. If additional images from the series are forthcoming, at step 430, the decoded data from the captured and decoded image is buffered for subsequent compilation of the entire data set. Alternatively, at step 440, it is determined that a linking indicator associated with the image indicates no additional images from the series are forthcoming. If no additional images from the series are forthcoming then, at step 450, a data set is compiled of the decoded data and any buffered data resulting in the entire data set.

FIGS. 6 and 7 provide more detailed flow diagrams of the process for image capture, decode and decode acknowledgement, in accordance with an embodiment of the present invention. In the embodiment according to FIG. 6, the linking indicator is the inclusion of a "not complete" flag in the encoded data. At step 500, the user has selected a data set to encode, segmented the data set into data portions and has initiated the encoding of the data portions into images. The encoded data includes a "not complete" flag as the linking indicator, which indicates that the additional images require capturing and decoding in order to complete the transfer of the data set. Additionally, a field within the coded data will indicate the feedback channels available to the sending device for receipt of a decode acknowledgement signal.

At step 510, the device that the data set is being transferred to captures the image that is displayed on the transferring device. At step 520 the image is decoded and the resulting decoded data is either added to a new buffer, if the image is the first sequenced image in the series, or appended to the existing buffer, if this is not the first sequenced image in the series.

At step 530, a determination is made as to whether the decoded data includes a "not complete" flag. If the decoded data does include a "not complete flag" then, at step 540, the decoding device will generate and communicate a decode acknowledgement signal. The signal will be transmitted on a channel that is available to both the decoding device and the transferring device, i.e., the image displaying device. At step 550, the transferring device receives the decode acknowledgement signal and, in response, displays the next-in-sequence image. Once the next-in-sequence image is displayed, the process returns to step 510, for further capturing of the next-in-sequence image.

Once a determination is made that the decoded data, of any images in the series, does not include a "not complete" flag then, at step 560, the data transfer is determined to be compete and compilation of the entire data set ensues.

In the embodiment according to FIG. 7 the linking indicator is the total number of images in the series and the inclusion of the linking indicator may be limited to the first image. At step 600, the user has selected a data set to encode, segmented the data set into data portions and has initiated the encoding of the data portions into images. The first image will include the total number of images in the series; this number serves as the linking indicator. Additionally, a field within the first image coded data will indicate the feedback channels available to the sending device for receipt of a decode acknowledgement signal.

At step 610, the device that the data set is being transferred to captures the image that is displayed on the transferring device. At step 620 the image is decoded and the resulting decoded data is added to a new buffer, if the image is the first sequenced image in the series, or appended to the existing buffer, if this is not the first sequenced image in the series.

At step 630, an image counter is incremented after the successful completion of the image decode process. At step 640, a determination is made as to whether the decoded data included a number indicating the total number of images in the series. If the decoded data includes such a number then, at step 650, the number is stored in device memory as the linking indicator. If the decoded data does not include such a number then, at step 660, a determination is made as whether the image counter number is less than the total number of tags, i.e., less than the number stored in device memory.

If the image counter number is less that the total number of tags then, at step 670, the decoding device will generate and communicate a decode acknowledgement signal. The signal will be transmitted on a channel that is available to both the decoding device and the transferring device, i.e., the image displaying device. At step 680, the transferring device receives the decode acknowledgement signal and, in response, displays the next-in-sequence image. Once the next-in-sequence image is displayed, the process returns to step 610, for further capturing of the next-in-sequence image.

Once a determination is made that the image counter number is not less than the total number of images, i.e., the image counter is equal or greater than the total number of images then, at step 690, the data transfer is determined to be compete and compilation of the entire data set ensues.

It will be understood that each block or step of the flowcharts in FIGS. 4-7, and combinations of blocks in the flowchart, can be implemented by computer program instructions. These computer program instructions may be loaded onto a computer or other programmable apparatus, such as the processor of the digital devices shown in FIGS. 1 and 2, to produce a machine, such that the instructions which execute on the computer or other programmable apparatus create means for implementing the functions specified in the flowchart block(s) or step(s). These computer program instructions may also be stored in a computer-readable memory of the mobile device that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Thus, the present invention provides for methods, devices and computer program products that provide for transferring relatively large amounts of data using visually encoded images, such as barcodes. Typically, visually encoded images, such as barcodes, are limited in the amount of data that they can store and, thus, transfer. The present invention overcomes this limitation by providing for methods that segment a large volume data set, encode each segment into an individual image and provided for each of the images to be linked in a series, so that the subsequent transfer and decoding of the images results in the transfer of the entire data set. The present invention benefits from being able to transfer large volume files or data sets using only visual coded images as the transfer medium. Additionally, the invention provides for a decode acknowledgement mechanism that assures that displayed images remain displayed until successful capture and decoding of the image occurs.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the cope of the appended claims. Although specific terms are employed herein, they are used in a generic and descriptive sense only and not for purposes of limitation.

That which is claimed:

1. A method for generating and displaying visually encoding data for short-range data communication, the method comprising:
    selecting data to be communicated;
    segmenting the selected data into a plurality of segments suitable for visual encoding, each of the segments being separable from any others of the segments;
    providing each of the plurality of segments with a distinct linking indicator that provides for related data segments to be sequenced;
    encoding each of the plurality of segments into a plurality images; and
    displaying, sequentially, each of the plurality images on a display device.

2. The method of claim 1, wherein said segmenting the selected data into a plurality of segments suitable for visual encoding further comprises analyzing the data to determine the size of the plurality of the segments based on a chosen visual code symbology.

3. The method of claim 1, wherein said segmenting the selected data into a plurality of segments suitable for visual encoding further comprises analyzing the data to determine the size of the plurality of the segments based on a viewable area of the display device.

4. The method of claim 1, wherein said providing each of the plurality of segments with a linking indicator further provides for the linking indicator to be defined as a portion number and a total portion number.

5. The method of claim 1, wherein said providing each of the plurality of segments with a linking indicator further provides for the linking indicator to be defined as an indication of more segments are forthcoming in the form of more images.

6. The method of claim 1, wherein said encoding each of the plurality of segments into a plurality of images further provides for encoding the linking indicator within the image.

7. The method of claim 1, wherein said encoding each of the plurality of segments into a plurality of images further provides for encoding error correction within the image.

8. The method of claim 1, wherein said displaying, sequentially, each of the plurality of images on a display device further comprises displaying, sequentially, each of the plurality of images on a display device after a device associated with the display device has received a decode acknowledgement signal from an image capturing device.

9. The method of claim 8, wherein said displaying, sequentially, each of the plurality of images on a display device after a device associated with the display device has received a decode acknowledgement signal from an image capturing device further defines the decode acknowledgement signal as chosen from the group consisting of a visual signal, an audio signal, a data signal and a magnetic signal.

10. A method for receiving visually encoded data via short-range data communication, the method comprising:
    capturing a first image from a series of images, each image of the series of images being separable from other images of the series of images;
    decoding the first image to determine first decoded data;
    determining that a linking indicator distinctly associated with the first image indicates a second image from the series is forthcoming for capture; and
    buffering the first decoded data for subsequent compilation of data related to the series of images.

11. The method of claim 10, further comprising:
    capturing a second image from the series of images; and
    decoding the second image to determine second decoded data.

12. The method of claim 11, further comprising determining if a linking indicator distinctly associated with the second image indicates that another image from the series is forthcoming for capture.

13. The method of claim 12, further comprising compiling the buffered data and the second decoded data into a complete data set if a determination is made that no further image from the series is forthcoming for capture.

14. The method of claim 11, further comprising buffering the second decoded data for subsequent compilation of data related to the series of images if a determination is made that at least one more image from the series is forthcoming for capture.

15. The method of claim 10, further comprising:
    capturing a concluding image from the series of images;
    decoding the concluding image to determine concluding decoded data;
    determining that a linking indicator distinctly associated with the concluding image indicates that no further images from the series are forthcoming; and
    compiling the buffered data and the concluding decoded data into a complete data set.

16. The method of claim 10, further comprising providing a decode acknowledgement signal to trigger presentation of the second image.

17. The method of claim 16, wherein said providing a decode acknowledgement signal to trigger presentation of the second image further defines the decode acknowledgement signal as chosen from the group consisting of a visual signal, an audible signal, a data signal and a magnetic signal.

18. A system for short-range data communication, the system comprising:
   a first digital device including,
      a first processor configured to
         segment data into a plurality of data segments suitable for visual encoding, each of the data segments being separable from any others of the data segments, to
         provide a distinct linking indicator for each of the plurality of data segments, to
         generate a series of images, each image corresponding to one of the data segments, and to
         sequentially display the series of images; and
      a display in communication with the processor that receives the series of images and sequentially displays the images; and
   a second digital device including
      an image capturing device capable of capturing the series of images; and
      a second processor in communication with the image capture device, the second processor being configured to decode the series of images and to analyze the linking indicator of each of the series of images to determine if more images require capturing.

19. The system of claim 18, wherein the first digital device is further defined as a handheld digital device.

20. The system of claim 18, wherein the first digital device is further defined as a stationary digital device.

21. The system of claim 18, wherein the second digital device is further defined as a handheld digital device.

22. The system of claim 18, wherein the second processor is further configured to generate and communicate a decode acknowledgement signal after successful decoding of each of the series of images.

23. The system of claim 22, wherein the decode acknowledgement signal is chosen from the group consisting of an audible signal, a visual signal, a data signal and a magnetic signal.

24. The system of claim 22, wherein the first processor is further configured to receive the decode acknowledgement signal and, in response to the signal, display a next sequential image from the series of images.

25. The system of claim 18, wherein the first processor is further configured to define the linking indicator as a segment number and a total segment number.

26. The system of claim 18, wherein the first processor is further configured to define the linking indicator as a notice that more images from the series are forthcoming.

27. A computer program product for generating and displaying images of visually encoded data, the product comprising a computer readable storage medium having computer-readable program instructions embodied in the medium, the computer-readable program instructions comprising:
   first instructions for segmenting data into a plurality of data segments, each of the data segments being separable from any others of the data segments;
   second instructions for providing each data segment with a distinct linking indicator that provides for related data segments to be sequenced;
   third instructions for visually encoding the plurality of data segments into a series of images; and
   fourth instructions for, sequentially, displaying the series of images on a display device.

28. The computer program product of claim 27, wherein the first instructions further provides for analyzing the data to determine the plurality of data segments needed based on visual encoding factors.

29. The computer program product of claim 27, wherein the second instructions for providing each data segment with a linking indicator further defines the linking indicator as a data segment number and a total data segment number.

30. The computer program product of claim 27, wherein the second instructions for providing each data segment with a linking indicator further defines the linking indicator as a notice that further visually encoded images are forthcoming.

31. The computer program product of claim 27, wherein the third instructions for visually encoded the plurality of data segments into a series of images further defines the images as barcode images.

32. The computer program product of claim 27, wherein the fourth instructions for, sequentially, displaying the series of images on a display device further comprise displaying a next sequential image from the series based on receipt of a decode acknowledgement signal.

33. A computer program product for receiving and decoding a series of images of visually encoded data, the product comprising a computer readable storage medium having computer-readable program instructions embodied in the medium, the computer-readable program instructions comprising:
   first instructions for capturing images from a series of images, each image of the series of images being separable from other images of the series of images;
   second instructions for decoding the images to determine decoded data;
   third instructions for processing a linking identifier distinctly associated with respective captured images to determine if more images from the series are forthcoming for capture; and
   fourth instructions for buffering the decoded data if a determination is made that more images from the series are forthcoming for capture.

34. The computer program product of claim 33, further comprising fifth instructions for compiling a complete data set if a determination is made that no more images from the series are forthcoming for capture.

35. The computer program product of claim 33, further comprising fifth instructions for generating and communicating a decode acknowledgement signal upon decoding a captured image.

36. The computer program product of claim 35, wherein the fifth instructions for generating and communicating a decode acknowledgement signal upon decoding a captured image further define the decode acknowledgement signal as chosen from the group consisting of an audible signal, a visual signal, a data signal and a magnetic signal.

37. An apparatus for generating and displaying a series of visually encoded data, the apparatus comprising:
   a processor configured to
      segment data into a plurality of data segments suitable for visual encoding, each of the data segments being separable from any others of the data segments, to
      generate a series of visually coded images, each image corresponding to one of the data segments, to
      provide a distinct linking indicator for each image of the series of images that provides for related data segments to be sequenced, and to
      sequentially display the series of images.

38. The apparatus of claim 37, wherein the apparatus is further defined as a handheld digital device.

39. The apparatus of claim 37, wherein the apparatus is further defined as a mobile telephone.

40. The apparatus of claim 37, wherein the apparatus is further defined as a stationary digital device.

41. The apparatus of claim 37, wherein the apparatus is further defined as a consumer vending device.

42. The apparatus of claim 37, wherein the processor is configured to receive a decode acknowledgement signal and, in response to the signal, to display a next sequential image from the series of images.

43. The apparatus of claim 37, wherein the processor is configured to provide the linking indicator as a data segment number and a total data segment number.

44. The apparatus of claim 37, wherein the processor is configured to provide the linking indicator as a notice that more images from the series are forthcoming for capture.

45. The apparatus of claim 37, further comprising a display in communication with the processor that receives the series of images and sequentially displays the images.

46. An apparatus for capturing and decoding a series of images of visually encoded data, the apparatus comprising:
a processor for receiving a series of images, each image of the series of images being separable from other images of the series of images, the processor being configured to decode a series of images, and to
analyze a linking indicator distinctly associated with each of the images to determine if further visually coded images from the series require capturing.

47. The apparatus of claim 46, wherein the apparatus is further defined as a mobile telephone.

48. The apparatus of claim 46, wherein the processor is configured to generate and communicate a decode acknowledgement signal after successful decoding of each of the series of images.

49. The apparatus of claim 48, wherein the decode acknowledgement signal is chosen from the group consisting of an audible signal, a visual signal, a data signal, and a magnetic signal.

50. The apparatus of claim 46, wherein the apparatus is further defined as a handheld digital device.

51. The apparatus of claim 46, further comprising an image capturing device in communication with said processor and configured to capture a series of images such that each image of the series of images is separable from other images of the series of images.

* * * * *